United States Patent
Cox et al.

(10) Patent No.: US 9,746,742 B2
(45) Date of Patent: Aug. 29, 2017

(54) ELECTRO-OPTIC MODULATOR WITH DISTRIBUTED GAIN

(71) Applicant: Photonic Systems, Inc., Billerica, MA (US)

(72) Inventors: Charles H. Cox, Carlisle, MA (US); Edward I. Ackerman, Cambridge, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 14/583,725

(22) Filed: Dec. 28, 2014

(65) Prior Publication Data

US 2016/0191167 A1    Jun. 30, 2016

(51) Int. Cl.
*H04B 10/00* (2013.01)
*G02F 1/225* (2006.01)
*G02F 1/21* (2006.01)

(52) U.S. Cl.
CPC ...... *G02F 1/2255* (2013.01); *G02F 2001/212* (2013.01)

(58) Field of Classification Search
USPC .................................................. 398/182–201
See application file for complete search history.

(56) References Cited

U.S. PATENT DOCUMENTS

| | | | | |
|---|---|---|---|---|
| 5,355,422 A * | 10/1994 | Sullivan | ................ | G02F 1/0356 385/1 |
| 7,039,258 B2 * | 5/2006 | Gunn, III | ................ | G02F 1/025 385/1 |
| 7,286,726 B1 * | 10/2007 | Keil | ...................... | G02F 1/0121 385/1 |
| 7,450,787 B2 * | 11/2008 | Kucharski | ............... | G02F 1/025 385/2 |
| 7,515,775 B1 * | 4/2009 | Kucharski | ............... | G02F 1/025 385/1 |
| 7,899,276 B2 * | 3/2011 | Kucharski | ............... | G02F 1/025 385/14 |
| 8,150,270 B2 * | 4/2012 | Bonthron | ............ | H03F 3/45089 398/182 |

(Continued)

OTHER PUBLICATIONS

Cox III, Charles, H., Analog Optical Links, 2006, pp. 278-284, Cambridge University Press.

(Continued)

*Primary Examiner* — Agustin Bello
(74) *Attorney, Agent, or Firm* — Kurt Rauschenbach; Rauschenbach Patent Law Group, LLC (57) ABSTRACT

An electro-optic modulator includes a Mach-Zehnder interferometer having a bias input, an optical input, and an optical output. A first arm comprises an optical waveguide. A second arm comprises an optical waveguide. A plurality of electrode segments is distributed along or proximate to a length of the optical waveguides of the first and second arms. A plurality of amplifiers, where at least one of the plurality of amplifiers has an RF input that receives an electrical modulation signal, and where each of the plurality of amplifiers are electrically connected to one of the plurality of electrode segments so as to provide distributed gain. A number of the plurality of amplifiers is chosen to achieve a desired combination of noise figure and spur-free dynamic range.

40 Claims, 7 Drawing Sheets

(56) References Cited

U.S. PATENT DOCUMENTS

| | | | | |
|---|---|---|---|---|
| 8,989,601 | B2* | 3/2015 | Temporiti Milani | G02F 1/0121 398/198 |
| 9,229,250 | B2* | 1/2016 | Minoia | G02F 1/225 |
| 2002/0154842 | A1* | 10/2002 | Betts | G02F 1/2255 385/2 |
| 2003/0206676 | A1* | 11/2003 | Ovadia | G02B 6/12007 385/11 |
| 2007/0230854 | A1* | 10/2007 | Felix Keil | G02F 1/0121 385/1 |
| 2007/0280576 | A1* | 12/2007 | Kucharski | G02F 1/025 385/1 |
| 2009/0148094 | A1* | 6/2009 | Kucharski | G02F 1/025 385/2 |
| 2009/0243717 | A1* | 10/2009 | Bonthron | H03F 3/45089 330/10 |
| 2009/0243718 | A1* | 10/2009 | Bonthron | H03F 3/45089 330/10 |

OTHER PUBLICATIONS

Lathi, B.P., Communication Systems, Dec. 1968, pp. 306-309, John Wiley & Sons, Inc. New York, US.

Wooten, et al., A Review of Lithium Niobate Modulators for Fiber-Optic Communications Systems, Jan./Feb. 2000, pp. 69-82, vol. 6, No. 1, IEEE Journal of Selected Topics in Quantum Electronics.

Cox, III, Charles H., Analog Optical Links, Theory and Practice, 2004, p. 34, Cambridge University Press, New York, US.

* cited by examiner

FIG. 5

ELECTRO-OPTIC MODULATOR WITH DISTRIBUTED GAIN

The section headings used herein are for organizational purposes only and should not to be construed as limiting the subject matter described in the present application in any way.

INTRODUCTION

Optical links are single end-to-end optical circuits that typically include an optical source that generates an optical beam, an optical modulator that impresses modulation onto optical beams so that the optical modulation corresponds to a desired electrical signal, an optical conveyance means, such as an optical fiber or free space, and an optical receiver that includes an optical detector that detects the transmitted optical signal and then demodulates the optical signal to obtain the transmitted information.

Electro-optic modulators are widely used in modern optical communications systems to impresses modulation onto optical beams. Modulating optical beams with electrical signals is desirable because once the electrical signal is transformed into the optical domain, it can be sent through an optical link over vast distances with a very low loss compared with loss experienced by signals propagating in the electrical domain. The optical signal is converted back into the electrical domain by a photodetector positioned at the receiving end of the optical link.

Noise Figure (NF) is an important performance metric of an optical link, especially optical links carrying analog signals. The noise figure characterizes the degradation of the signal-to-noise ratio as the signal traverses the optical link. Ideally, an optical link would be able to preserve the signal-to-noise ratio perfectly, but in reality, noise is added, typically from every component along the link, degrading the signal-to-noise ratio at the optical link output. The noise figure is defined as the ratio of the signal-to-noise ratio at the input to the signal-to-noise ratio at the output of a system. Lower values of noise figure indicate better performance. By convention, the noise figure is expressed in decibels (dB). Common noise sources include thermal noise, shot noise, relative intensity noise (RIN) from the laser source intensity fluctuation, and noise added by electrical and optical amplification.

An optical link represents a series of components. The gain of the optical link is calculated by combining the individual gains of each component in the system. This is commonly referred to in the art as a cascaded gain. In a chain of components comprising amplifiers, each amplifier in the chain has an equal effect on the total gain.

A second important link performance parameter is the noise figure of the optical link, which is calculated from a combination of the individual noise figures of each component in the system. This is commonly referred to as a cascaded noise figure. In a chain of components comprising amplifiers, the first amplifier in the chain has the most significant effect on the total noise figure. Conventional wisdom holds that the highest gain, lowest noise figure amplifier, should usually be placed ahead of the others.

A third important performance parameter for optical links, especially those carrying analog signals, is the Spurious Free Dynamic Range (SFDR). This is the ratio of the strength of the fundamental signal, or carrier, to the strength of the strongest spurious signal, noise or harmonic of the carrier, at the output. Spur-free dynamic range occurs because noise and inherent nonlinearities of various components that are used in even the best signal generators will generate frequency content at harmonics (or multiples) of the fundamental signal. From a design perspective, the spur-free dynamic range of the link often provides an engineering compromise with the noise figure of the link, since high-gain, low-noise figure amplifiers, which reduce noise figure, can tend to decrease the spurious-free dynamic range.

A fourth important link parameter is the frequency response of the optical link, which is calculated from a combination of the individual frequency responses of each component in the system. This is commonly referred to as a cascaded frequency response. In a chain of components comprising amplifiers, each amplifier in the chain has an equal effect on the total frequency response.

Therefore, what is needed is a practical optical link system design that provides a low noise figure, while at the same time providing a large spurious-free dynamic range. Furthermore, optical link system design must be cost effective and not negatively impact the system bandwidth.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The methods and apparatus of the present teaching apply to any type of electro-optic modulator with at least one long electrode. The term "long electrode" is defined herein as an electrode where the RF attenuation of the electrode has diminished the strength of the modulating signal to the point that additional electrode length is no longer effective at imposing modulation on the optical carrier. An example of an electro-optic modulator with a single long electrode is a single waveguide optical phase modulator. An example of an electro-optic modulator with multiple long electrodes is a directional coupler optical modulator. Another example of an electro-optic modulator with multiple long electrodes is an interferometric modulator, such as a Mach Zehnder type electro-optical modulator. One skilled in the art will appreciate that optical modulators according to the present teaching can be fabricated with any type of electro-optical material, including, for example, lithium niobate, numerous electro-optic polymers and numerous semiconductors, such as Si, GaAs, InP, etc.

Mach-Zehnder interferometric type electro-optic modulators are widely used in optical communications links. Many of these Mach-Zehnder modulators are fabricated with lithium niobate. However, one skilled in the art will appreciate that the Mach-Zehnder interferometric type electro-optic modulators of the present teaching can be formed of any type of electro-optic material, including electro-optic polymers and semiconductors, such as III-V compound semiconductors like GaAs and InP.

Lithium niobate is widely used as an electro-optical material in modulators because it has many desirable characteristics, such as a very high intrinsic modulation bandwidth. See, for example, E. L. Wooton, et al., "A Review of Lithium Niobate Modulators for Fiber-Optic Communications Systems," IEEE Journal of Selected Topics in Quantum Electronics, VOL. 6, NO. 1, January 2000, which is incorporated herein by reference.

The two types of lithium niobate Mach-Zehnder interferometric modulators that are commonly used are "X-cut" and "Z-cut" lithium niobate Mach-Zehnder modulators. The terms "X-cut" and "Z-cut" refer to the relative orientation of the crystal axes to the waveguides and electrodes. The crystal cut orientation affects both modulator efficiency, and modulator chirp, which is described further below.

Figure 1A:
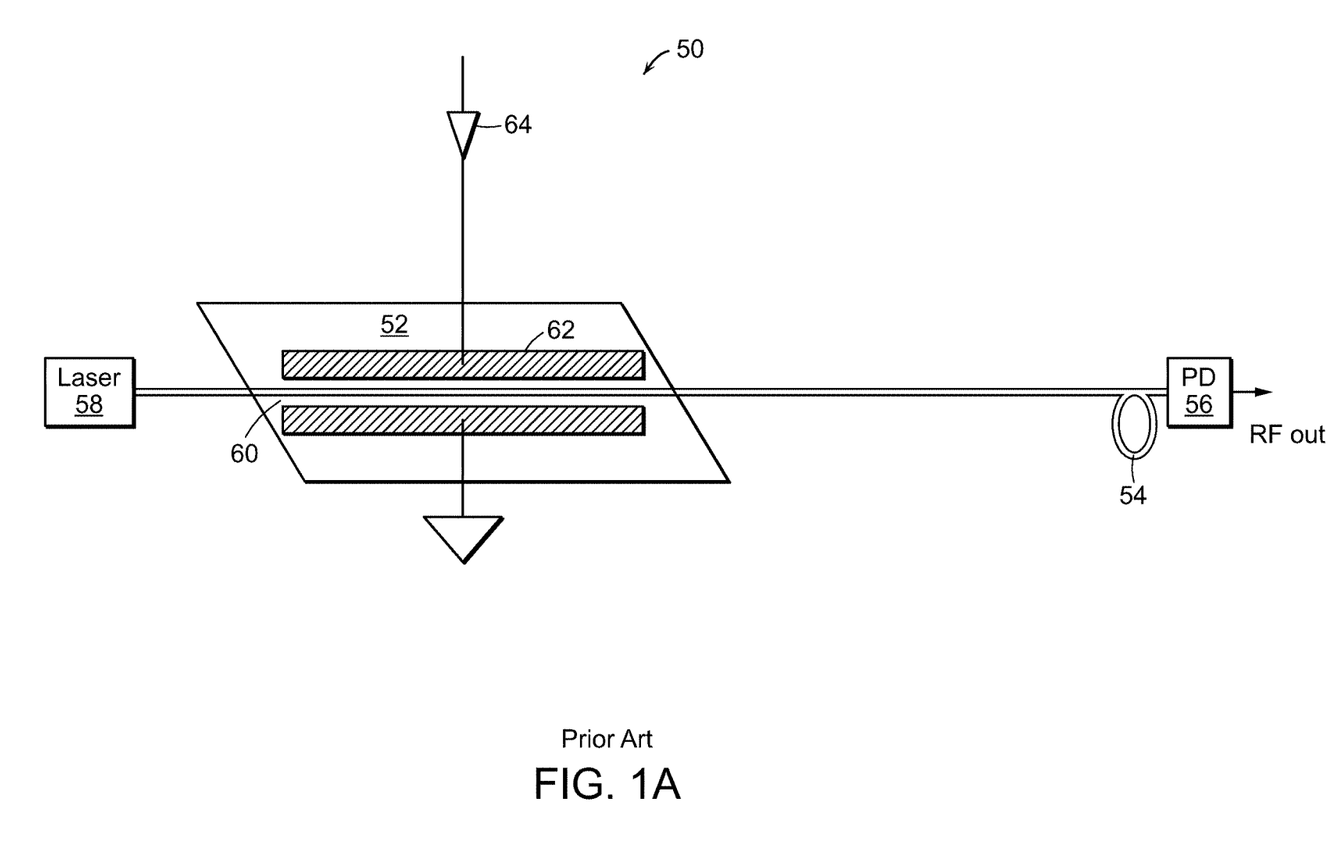
FIG. 1A illustrates a known optical link that includes a single electrode electro-optic phase modulator, optical conveyance, and a photodetector.

FIG. 1A illustrates a known optical link 50 that includes a single electrode electro-optic phase modulator 52, optical conveyance, such as an optical fiber 54, and a photodetector 56. The modulator 52 includes an optical input that is coupled to an output of an optical source, such as a laser 58, an optical waveguide 60, and modulating electrodes 62. The modulator 52 also includes an RF signal input port that is coupled to an electronic amplifier 64 that receives the modulation signal. This particular optical link 50 uses an optical fiber 54 to convey the optically modulated signal from the modulator 52 to the photodetector 56. The photodetector 56 can be, for example, a photodiode. The photodetector 56 generates an electrical modulation signal that is demodulated by a receiver.

Figure 1B:
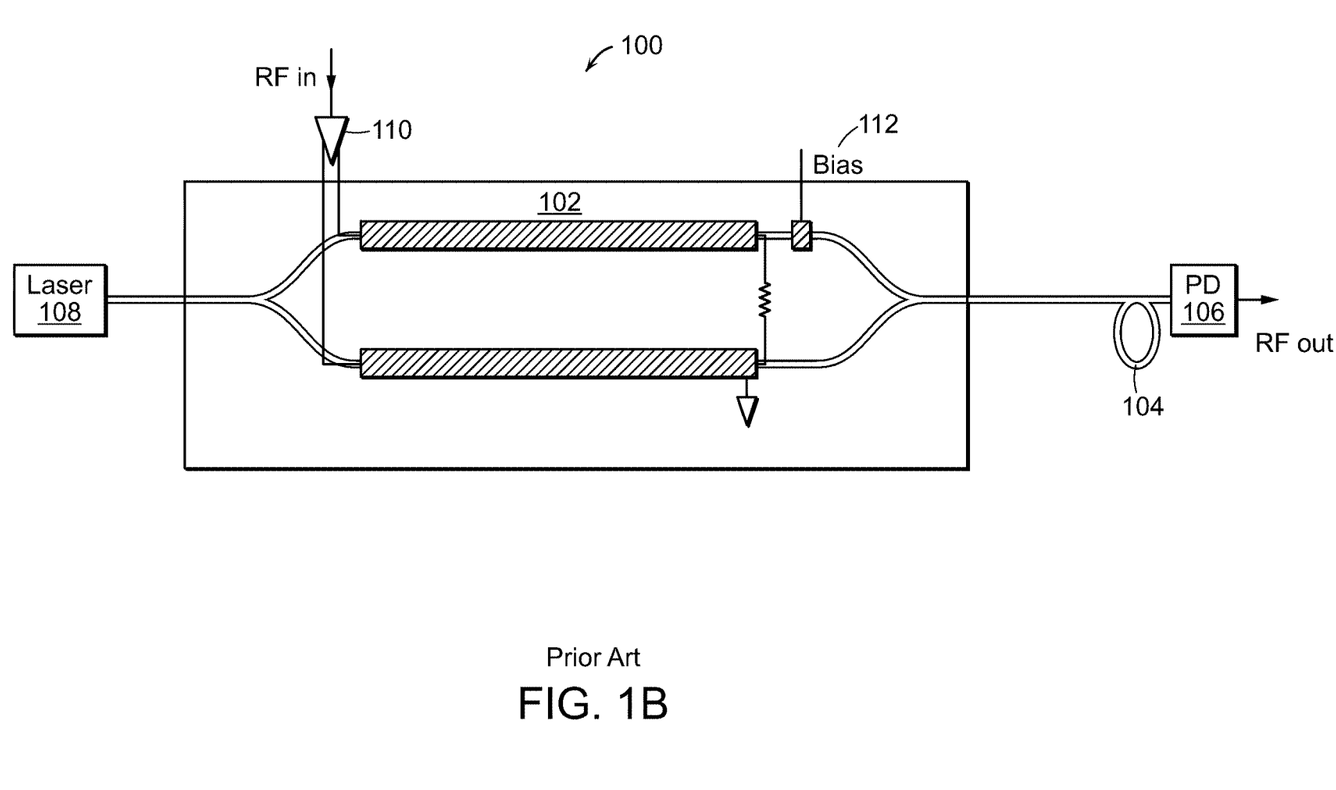
FIG. 1B illustrates a known optical link that includes a Z-cut Mach-Zehnder interferometric type electro-optic modulator, optical conveyance, and a photodetector.

FIG. 1B illustrates a known optical link 100 that includes a Z-cut Mach-Zehnder interferometric type electro-optic modulator 102, optical conveyance 104, and a photodetector 106. The modulator 102 includes an optical input that is coupled to an output of an optical source, such as a laser 108. The modulator also includes an RF signal input port that is coupled to an electronic amplifier 110 that receives the modulation signal, and a bias port 112 that receives a DC bias signal. This particular optical link 100 uses an optical fiber 104 to convey the optically modulated signal from the modulator 102 to the photodetector 106. The photodetector 106 can be, for example, a photodiode. The photodetector 106 generates an electrical modulation signal that is demodulated by a receiver.

Z-cut lithium niobate Mach-Zehnder interferometric type electro-optic modulators are sensitive to vertical components of a modulating electrical field. The strongest component of the applied electric field must be aligned with the axis of the crystal, which has the highest electro-optic coefficient. This requires that the waveguide be placed beneath the electrodes for Z-cut materials. Because the electrodes are placed on top of the waveguides, Z-cut devices typically require a buffer layer to minimize attenuation of the optical mode due to metal absorption. Z-cut modulator devices also typically employ conductive buffer layers and charge-bleed layers to mitigate DC drift and pyroelectric charge buildup. Modulators made on Z-cut wafers also require special design and packaging to minimize bias drift due to charge migration and the buildup of pyroelectric charges.

Many Z-cut Mach-Zehnder modulators are operated in a push-pull configuration where both arms of the Mach-Zehnder interferometer are biased around a common value and each arm is driven to provide a phase change with signs opposing each other. This configuration is desirable because it results in chirp-free modulation ($\alpha_m = 0$). The chirp parameter $\alpha_m$ can be expressed as the ratio of the sum of the phase change in each arm of the Mach-Zehnder interferometer ($\Delta\phi_1 + \Delta\phi_2$) to the difference in the phase change in each arm of the Mach-Zehnder interferometer ($\Delta\phi_1 - \Delta\phi_2$) as follows:

$$\alpha_m = (\Delta\phi_1 + \Delta\phi_2)/(\Delta\phi_1 - \Delta\phi_2).$$

However, in recent years, it has been determined that optical transmission performance with optical signals having transmission wavelengths in the non-zero fiber dispersion wavelength range can be improved by modulating signals with a small negative chirp parameter.

Figure 1C:
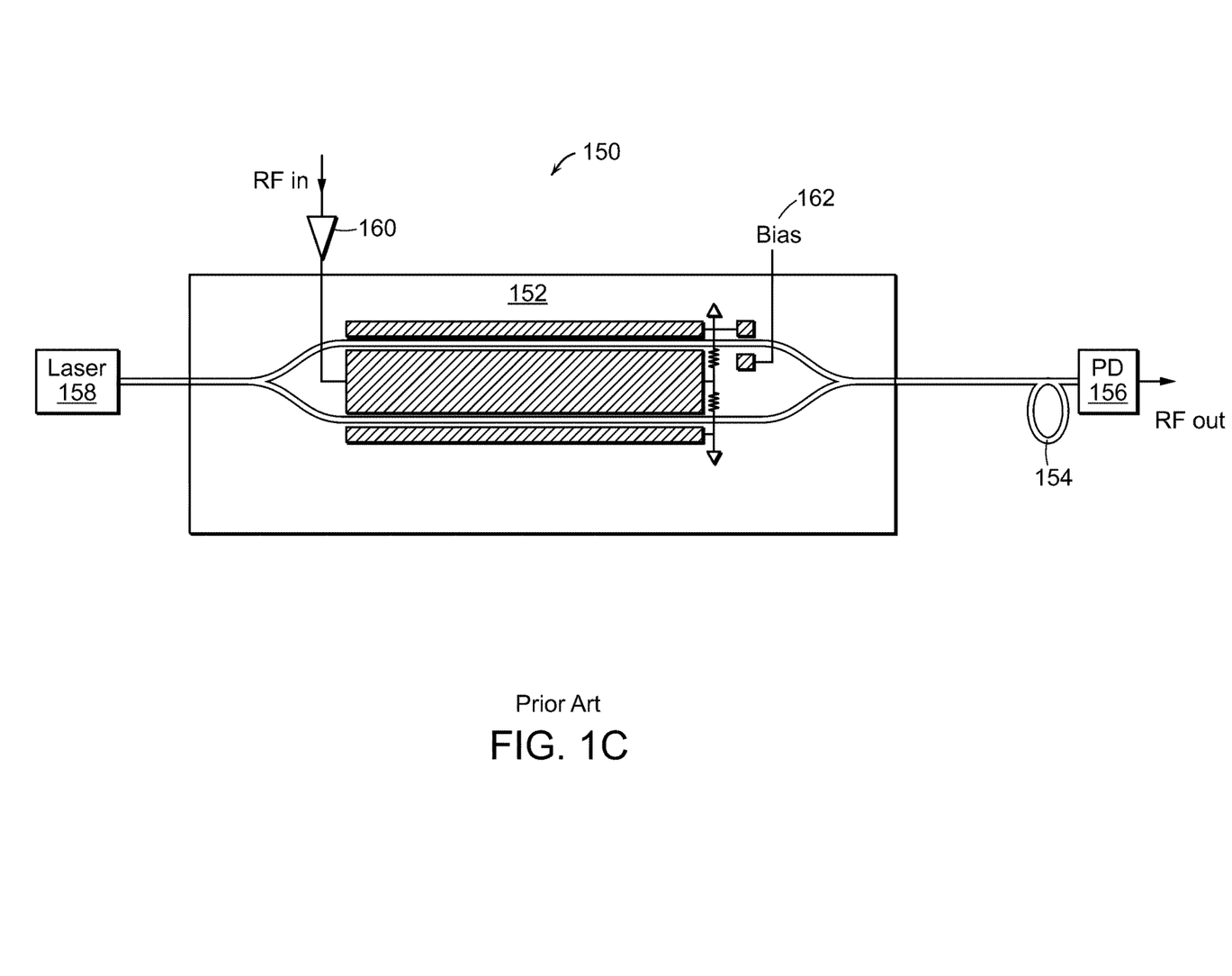
FIG. 1C illustrates a known optical link that includes an X-cut Mach-Zehnder interferometric type electro-optic modulator, optical conveyance, and a photodetector.

FIG. 1C illustrates a known optical link 150 that includes an X-cut Mach-Zehnder interferometric type electro-optic modulator 152, optical conveyance 154, and a photodetector 156. This particular optical link 150 is similar to the optical link 100 described in connection with FIG. 1B, but is formed with X-cut lithium niobate electro-optic material that is sensitive to horizontal components of a modulating electrical field. The modulator 152 includes an optical input that is coupled to an output of an optical source, such as a laser 158. The modulator 152 also includes an RF signal input port that is coupled to an electronic amplifier 160 that receives the modulation signal, and a bias port 162 that receives a DC bias signal. This particular optical link 150 also uses an optical fiber 154 to convey the optically modulated signal from the modulator 152 to the photodetector 156, which can be, for example, a photodiode. The photodetector 156 generates an electrical modulation signal that is demodulated by a receiver.

X-cut lithium niobate Mach-Zehnder modulators do not inherently need a buffer layer because the electrodes are not placed directly above the waveguides. However, to achieve high-frequency, broad-band operation, these devices typically include a buffer layer for velocity matching the RF and optical waves.

X-cut lithium niobate Mach-Zehnder electro-optic modulators are advantageous for some applications because they have relatively high electro-optic efficiency per unit length. However, the velocity mismatch of X-cut devices typically limits bandwidth and the electrode impedance tends to introduce impedance mismatch and RF loss. RF electrodes on buffered X-cut substrates can be designed for velocity matching and impedance matching at particular impedances.

In known Mach-Zehnder interferometric modulators, all the gain is located at the input to the electro-optic modulator, which results in the lowest link Noise Figure, NF, but at the sacrifice of Spur-Free Dynamic Range (SFDR). Spur-free dynamic range is an important metric that defines the relationship between the amplitude of the fundamental frequency being generated and the amplitude of the associated harmonic. In particular, spur-free dynamic range is the strength ratio of the fundamental signal to the strongest spurious signal in the output. Spur-free dynamic range is a measure of the range of powers over which the input signals do not produce spurs that are above the noise floor. Various components of even the best signal generators, will generate frequency content at harmonics (or multiples) of the desired tone.

It is highly desirable for electro-optic modulators to achieve sufficient sensitivity to enable the optical link to have a low noise figure such as a value of less than 6 dB. Noise figure is a measure of degradation of the signal-to-noise ratio (SNR) that is caused by various components in the link. It is a number by which the performance of components, such as optical links, can be specified, with lower values indicating better performance. More specifically, the term "noise figure" as used herein is the noise factor expressed in decibels, and is defined as the ratio of the output noise power of a component, such as an optical link, to the portion thereof attributable to thermal noise in the input termination at standard noise temperature, which is usually 290 K. In other words, noise factor is the ratio of actual output noise to that which would remain if the device itself did not introduce noise.

The intrinsic noise figure of a typical link is at least 20 dB and can easily exceed 50 dB, especially at high frequencies. The term "intrinsic noise figure" as used herein means the noise figure without any electrical pre-amplification. One can reduce the noise figure of an optical link to an arbitrarily low level by preceding it with an amplifier with sufficiently high gain and low noise figure, as shown by the amplifier 110 shown in FIG. 1A and the amplifier 160 as shown in FIG. 1B. However, the tradeoff of using such an amplifier, 110 (FIG. 1A) or 160 (FIG. 1B) is a sacrifice in the spur-free dynamic range where the reduction in SFDR increases as the amount of pre-amplifier gain increases. See, for example, Cox, C. H., *Analog Optical Links*, Cambridge University Press, UK, 2004, pp. 278-284.

Electro-optic modulators that have high enough sensitivity to achieve low noise figure without the need for any pre-amplification have been demonstrated. However, presently these modulators have not been widely used because they have significant disadvantages in that they are costly, typically require high optical power, and typically have insufficient bandwidth for many applications. Some low-cost optical modulators with high-sensitivity are commercially available, but these modulators only operate with high-sensitivity at relatively low frequencies. The sensitivity of these modulators degrades significantly as frequency increases because of increases in the modulator electrode loss with increasing frequency. Presently, there is no low-cost, wide-bandwidth, high-sensitivity modulator commercially available, and there is a significant need for such a device.

A properly designed electro-optic modulator according to the present teaching can simultaneously meet the goals of achieving high-sensitivity, wide-bandwidth operation, and relatively low power consumption. In addition, an electro-optic modulator according to the present teaching can be manufactured at relatively low cost by using existing electro-optic modulator technologies modified according to the present teaching.

One aspect of the present teaching is the realization that the degradation in spur-free dynamic range increases with the amplifier gain. Thus, the lower the amplifier gain, the lower the degradation in spur-free dynamic range. Electro-optic modulators according to this aspect of the present teaching break up the total amplifier gain and distribute it among multiple, lower gain amplifiers that are distributed in space uniformly or non-uniformly along the length of the electrodes.

However, it is well known that to be most effective at reducing the noise figure, the gain needs to be experienced before the noise figure is degraded. Thus, conventional thinking leads one skilled in the art to believe that amplifiers need to be located before the modulator electrodes of an electro-optic modulator, which means that the amplifiers must be positioned at the input to the modulator. However, it has been discovered that the noise figure increases only modestly with electro-optic modulators (approximately in the 2 dB range for some embodiments) when all the gain is not experienced at the modulator input. Well-established thinking among those skilled in the art is that if one were to not locate all the amplifiers at the input to the modulator, the noise figure would be seriously degraded. This has been shown to not be true. Furthermore, it has been discovered, quite unexpectedly, that the spur-free dynamic range increases dramatically, (approximately in the 20 dB range) when the gain is distributed along the modulator electrodes. Such a design is in contrast to prior art electro-optic modulators that "lump" all of the gain in one discrete low-noise amplifier prior to the input to the modulator electrodes.

Figure 2:
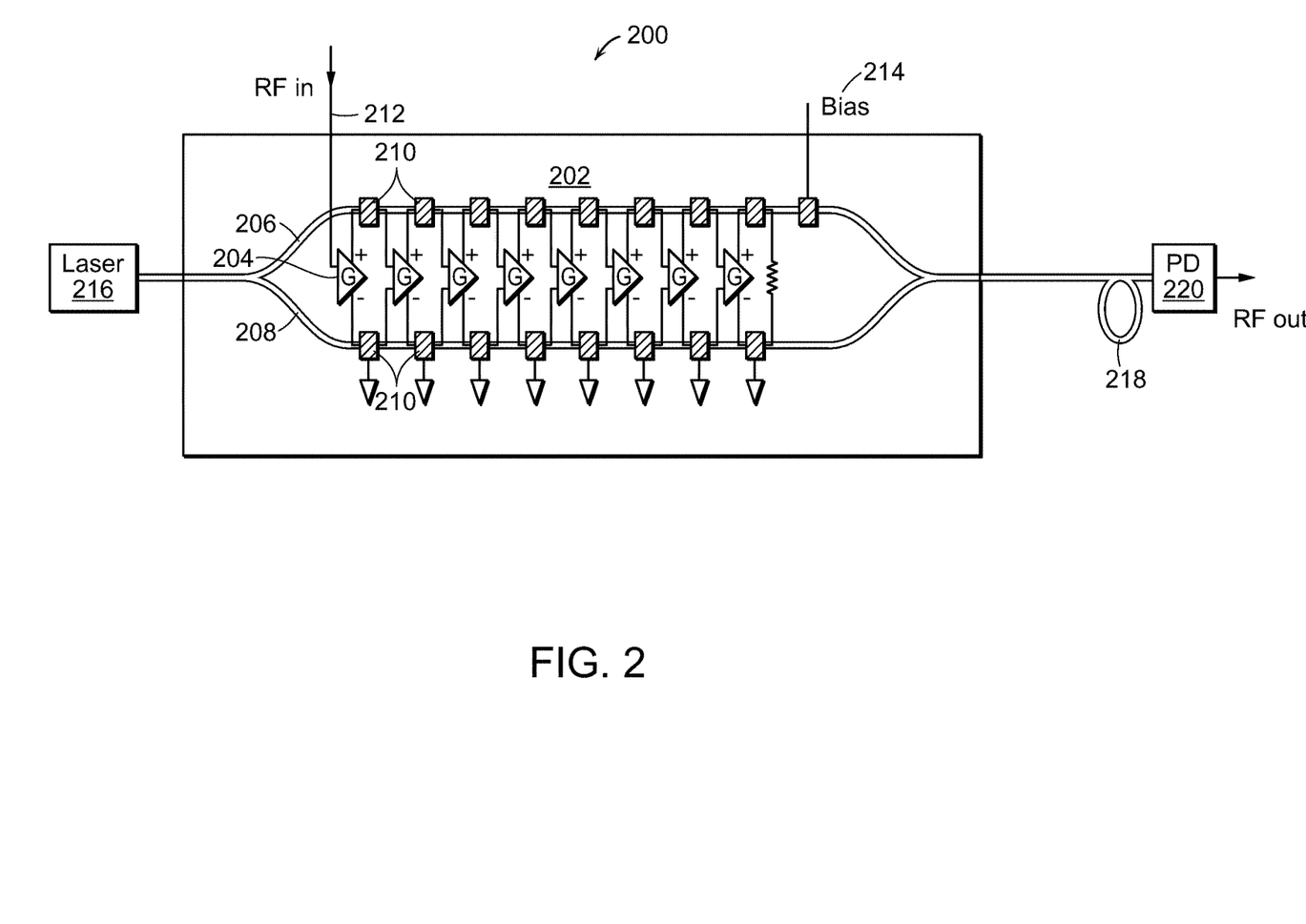
FIG. 2 illustrates a schematic view of an optical link with an electro-optic modulator according to the present teaching that increases both the sensitivity and the flatness of the frequency response by distributing gain elements along a length of a Z-cut Mach-Zehnder interferometric type of electro-optic modulator.

FIG. 2 illustrates a schematic view of an optical link 200 with an electro-optic modulator 202 according to the present teaching that increases both the sensitivity and the flatness of the frequency response by distributing a plurality of gain elements 204 along a length of a Z-cut Mach-Zehnder interferometric type of electro-optic modulator 202. In the embodiment shown in FIG. 2, the electro-optic modulator 202 comprises a Mach-Zehnder type electro-optical modulator that includes a first arm 206 and a second arm 208, each with electrodes that are divided and distributed along a plurality of equal-length segments 210. Each of the plurality of gain elements 204 is a relatively low-gain amplifier that is electrically connected between respective electrode segments 210, as shown in FIG. 2. The modulator 202 also includes an RF signal input port 212 that is coupled to the first of the plurality of amplifiers 204 that receives the modulation signal, and a bias port 214 that receives a DC bias signal. In addition, the modulator 202 includes an optical input that is coupled to an output of an optical source, such as a laser 216. The optical link 200 also uses an optical fiber 218 to convey the optically modulated signal from the modulator 202 to the photodetector 220, which can be, for example, a photodiode.

In various embodiments, the gain G of each of the plurality of relatively low-gain amplifiers 204 is the same or is different depending on the desired performance. Note that the electrode geometry and amplifier 204 placement are not drawn to scale. In particular, in an actual electro-optic modulator according to the present teaching, the length of the electrode segments 210 is significantly longer than the gaps between the electrodes where the amplifiers 204 are located.

The length of the electrode segments 210 is an important parameter in the electro-optic modulator of the present teaching. The electrode segments 210 must be long enough to distribute the desired gain with low enough individual gains to achieve the desired performance. For example, in one particular embodiment, the total length of the electro-optic modulator is approximately 5 cm. Assuming eight equally spaced amplifiers, the electrode segment length is about 0.5 cm. Generally, longer electrodes will increase sensitivity. But, electrode length is limited by loss of the electrodes. In one embodiment, low loss or even superconducting electrodes are used. One feature of the present teaching is that electrodes with relatively high loss can still be used to construct a high performance modulator because each of the electrode segments does not impart enough loss to significantly degrade the signal.

One skilled in the art will appreciate that the modulation electrode segments 210 of an electro-optic modulator according to the present invention can be segmented with numerous uniform and non-uniform geometries. Furthermore, one skilled in the art will appreciate that the gain elements (amplifiers 204) can have numerous uniform and non-uniform numerical gains.

In order to describe the design and benefits of the electro-optical modulator of the present teaching, a relatively simple electrode geometry and gain distribution is selected. In the following analysis, it is assumed that each electrode is divided into N equal length segments and that there are N equal gain amplifiers located at the input to each electrode segment. Rigorous performance modeling of the link described in connection with FIG. 2 was performed by deriving the following closed-form expressions for the performance of the electro-optic modulator operating at a single-wavelength. Starting with the expression for gain, the total gain G of the distributed amplifier configuration can be expressed as:

$$G = 10\log[g] = 10\log\left[\left(\frac{\pi t_{\mathit{ff}} r_d P_l R_0}{4NV_\pi}\sin\phi \sum_1^N g_{amp}^n\right)^2\right],$$

where N is the number of amplifiers in the distributed configuration. For example, there are eight amplifiers shown in FIG. 2, so N=8 for the configuration shown in FIG. 2. The parameter $t_{\mathit{ff}}$ is the modulator's optical insertion loss. The parameter $r_d$ is the photodetector's responsivity. The parameter $P_I$ is the optical input power to the modulator. The parameter $R_0$ is the system impedance, which is typically 50Ω. The parameter $\phi$ is the modulator bias point, which is typically biased at quadrature $\pi/2$. The parameter $g_{amp}$ is the individual amplifiers' voltage gain.

An important parameter of a Mach-Zehnder interferometric modulator is $V\pi$, which is defined as the voltage that changes the phase in one arm of the interferometer by 180 degrees ($\pi$ radians) relative to the other arm. Thus, the parameter $V\pi$ of an MZI is the voltage that switches the output light between its maximum and minimum intensities.

The accumulated noise of the multiple-amplifier optical link can be expressed in decibels as:

$$\overline{N_{out}} = 10\log\left[kT_0g + \left(\frac{\pi t_{\mathit{ff}} r_d P_l R_0}{4NV_\pi}\sin\phi\right)^2 \sum_1^N g_{amp}^{2n-1} kT_0(nf_{amp} - 1) + \frac{2qI_D + I_D^2 RIN}{4}R_0 + kT_0\right]$$

where $nf_{amp}$ is the noise factor of each amplifier. The parameter RIN is the relative intensity noise of the laser. Relative intensity noise characterizes the instability in the intensity of a laser. The parameter k is Boltzman's constant, $T_0$=290 K, and q is the electronic charge. The parameter $I_D$ is the photodetector's average photocurrent, which can be expressed as:

$$I_D = \frac{t_{\mathit{ff}} r_d P_l}{2}[1 + \cos\phi].$$

The noise figure of the multiple-amplifier optical link can then be expressed as:

$$NF = 10\log[nf] = 10\log\left[\frac{n_{out}}{kT_0g}\right] = \overline{N_{out}} + 174 \text{ dBm/Hz} - G,$$

where $n_{out}$ is the total noise at the output of the optical link, which includes the amplified input noise plus the noise added in the link, and $kT_0g$ is the amplified input noise. The parameter nf is the noise factor, often referred to as the "noise figure in linear terms," being related to noise figure NF through the expression:

$$NF=10 \log [nf].$$

The power in the $3^{rd}$-order spur at the link output can then be expressed as:

$$P_{out}(2\omega_1 - \omega_2) =$$

$$\left(\frac{t_{ff}r_d P_l R_0^2}{2}\sin\phi\right)^2 \left[\frac{1}{8}\left(\frac{\pi}{NV_\pi}\right)^3 \sum_1^N g_{amp}^{3n} + \frac{\pi}{NV_\pi ip3_{in,amp}^2}\sum_1^N g^{3N-2n}\right]^2 P_{in}^3(\omega_1)$$

where $\omega_1$ and $\omega_2$ represent two different signal frequencies injected into the system that generate harmonic distortion.

The input intercept point, $ip3_{in}$, is the input power at $\omega_1$ at which the output power in the spur equals the input power at $\omega_1$ times the amplifier gain. This can be expressed as:

$$ip3_{in} = P_{in}(\omega_1) \text{ at which } P_{out}(2\omega_1 - \omega_2) = gP_{in}(\omega_1),$$

where $g_{amp}$ and $ip3_{in,amp}$ are the individual amplifier's voltage gain and input intercept point, respectively.

The spur-free dynamic range is represented as:

$$SFDR = 10\log[sfdr] = 10\log\left[\left(\frac{ip3_{in}}{kT_0 nf}\right)^{\frac{2}{3}}\right].$$

Figure 3:
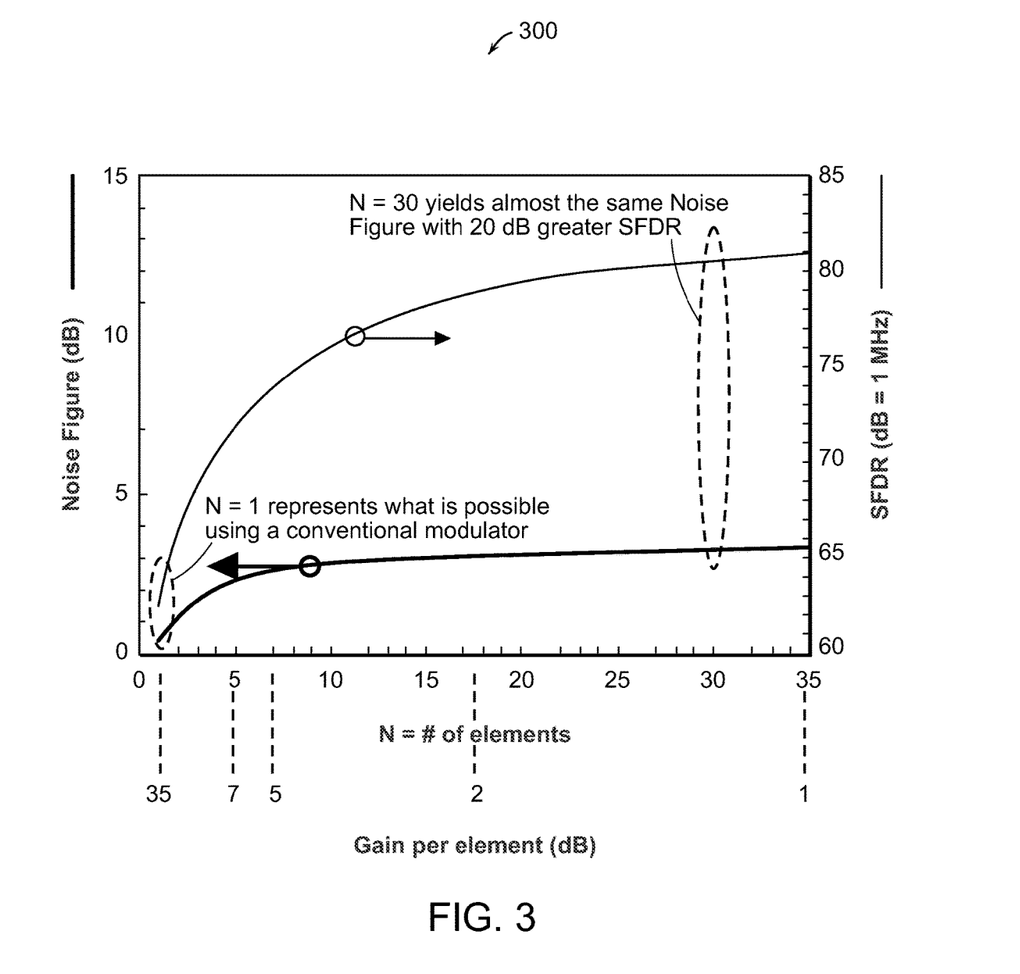
FIG. 3 illustrates theoretical performance data for an optical link including an electro-optic modulator with gain elements distributed along the length of a Mach-Zehnder interferometric type electro-optic modulator according to the present teaching.

FIG. 3 illustrates theoretical performance data 300 for an optical link including an electro-optic modulator with gain elements distributed along the length of a Mach-Zehnder interferometric type electro-optic modulator according to the present teaching. More specifically, FIG. 3 illustrates a plot of both noise figure in dB and spur-free dynamic range in dB as a function of the number of gain elements. The performance data for noise figure and spur-free dynamic range was generated by solving the above equations for the electro-optic modulator described in connection with FIG. 2.

The calculations were performed keeping the net gain of all gains constant at 35 dB. The number of gain stages, N, was varied from 1 to 35. The analytical model assumes $V_\pi=2$ V for the entire electrode, that is, for a single gain element when N=1. The analytical model also assumes quadrature biasing of the modulator. In addition, the analytical model assumes an internally terminated balanced photodetector with a photocurrent equal to 30 mA. In addition, the analytical model assumes a relative intensity noise equal to −160 dB/Hz.

The limit where the number of gain elements equals one, N=1, corresponds to the conventional configuration that was described in connection with FIG. 1, where a single, high-gain amplifier is located at the input to a modulator and has a gain equal to 35 dB. Conventional electrodes with single, uninterrupted lines are assumed. The amplifier performance, when not split up into stages, has a gain G equal to 35 dB, a noise figure NF equal to 2.8 dB, and an input intercept point, $ip3_{in}$, equal to 11 dBm. As expected, this conventional configuration does indeed produce the lowest noise figure, but at the sacrifice of the lowest spur-free dynamic range.

As the net 35 dB of gain is split into an increasing number of gain elements, according to the present teaching as shown in FIG. 2, less of the gain is experienced in front of the link. FIG. 3 illustrates the noise figure NF in dB and the spur-free dynamic range in dB for a 1 MHz bandwidth as a function of both the number of stages into which this amplification is divided and, equivalently, the amplification per stage. As expected, moving the gain away from the front of the link adversely affects the noise figure. However, unexpectedly, as the number of gain elements reaches seven elements, N=7, where the gain per element is 5 dB, the increase in the noise figure begins to plateau at about 3 dB.

The spur-free dynamic range, however, continues to improve as the number of gain elements is increased. Depending on the configuration, the spur-free dynamic range may not plateau until the spur-free dynamic range limit of the amplifier is reached. Assuming that the amplifier has about 8 dB of gain with a one MHz instantaneous bandwidth, the spur-free dynamic range improvement is about 20 dB relative to the conventional configurations where all the amplification is performed before the modulator, as described in connection with FIG. 1 and represented as N=1 in FIG. 3. The fact that there is only a modest increase in the noise figure and a continuing increase in the spur-free dynamic range as the number of gain elements increases is a surprising result. Thus, one feature of the present teaching is that by distributing the RF gain along the modulator electrodes, an optical link can be constructed with low noise figure and high spur-free dynamic range.

One aspect of the present teaching is that the electro-optic modulator of the present teaching can be easily designed to achieve a particular combination of noise figure and spur-free dynamic range to improve or optimize a particular system. That is, well-known optimization techniques could be employed to determine the geometry, number, and length of the electrode segments, as well as the total gain and the distribution of gain among the plurality of amplifiers distributed along the electro-optic modulator. Furthermore, the performance of each of the plurality of amplifiers distributed along the electro-optic modulator, such as their individual noise figures and spur-free dynamic range, could also be varied to achieve particular combination of noise figure and spur-free dynamic range for a particular design.

Figure 4:
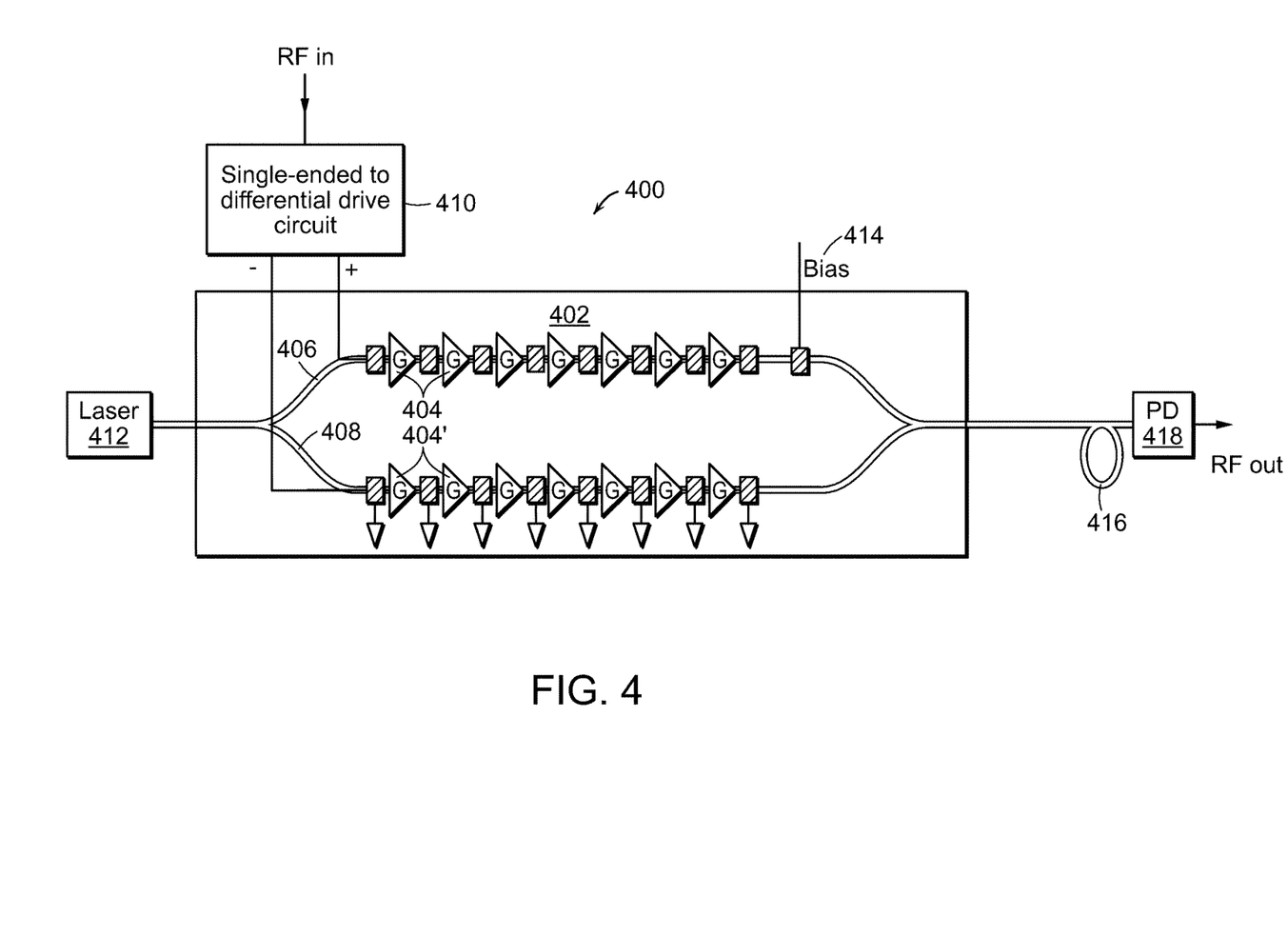
FIG. 4 illustrates a schematic view of an optical link with a Z-cut lithium niobate Mach-Zehnder interferometric type electro-optic modulator with first and second plurality of single-ended amplifiers, according to the present teaching, that increases both the sensitivity and the flatness of the frequency response by distributing gain elements along a length of the modulation electrodes.

FIG. 4 illustrates a schematic view of an optical link 400 with a Z-cut lithium niobate Mach-Zehnder interferometric type electro-optic modulator 402 with first 404 and second plurality of single-ended amplifiers 404' according to the present teaching. Like the other embodiments, this modulator configuration increases both the sensitivity and the flatness of the frequency response by distributing gain elements along a length of the modulation electrodes. The electro-optic modulator 402 of FIG. 4 is similar to the electro-optic modulator 202 that is described in connection with FIG. 2. However, a first 404 and a second plurality of single-ended amplifiers 404' are distributed along the length of the electro-optic modulator 402 instead of a plurality of differential amplifiers.

More specifically, the first plurality of single-ended amplifiers 404 is distributed along a first arm 406 of the Mach-Zehnder interferometric modulator 402. A second plurality of single-ended amplifiers 404' is distributed along a second arm 408 of the Mach-Zehnder interferometric modulator 402. In this embodiment, the first plurality of single-ended amplifiers 404 distributed in the first arm 406 is driven out-of-phase relative to a second plurality of single-ended amplifiers 404' distributed in the second arm 408 of the Mach-Zehnder interferometric type of electro-optic modulator 400. In various embodiments, a passive or an active single-ended-to-differential drive circuit 410 is used to drive each of the plurality of single-ended amplifiers.

The modulator 402 includes an optical input that is coupled to an output of an optical source, such as a laser 412. The modulator 402 also includes a bias port 414 that receives a DC bias signal. This particular optical link 400 also uses an optical fiber 416 to convey the optically modulated signal from the modulator 402 to the photodetector 418, which can be, for example, a photodiode. The photodetector 418 generates an electrical modulation signal that is demodulated by a receiver.

Figure 5:
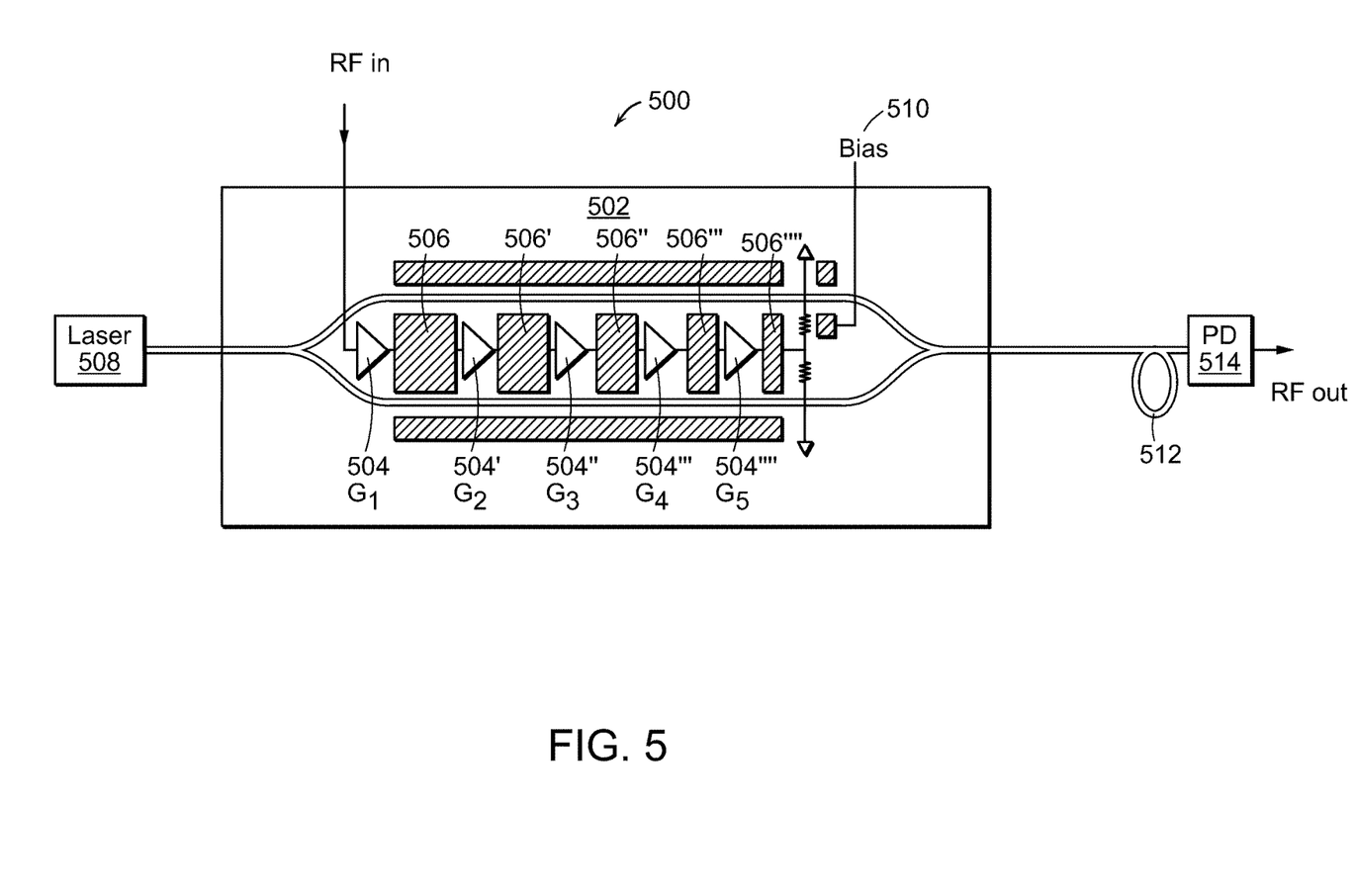
FIG. 5 illustrates a schematic view of an optical link with an X-cut lithium niobate Mach-Zehnder interferometric type electro-optic modulator with a plurality of single-ended amplifiers that drive a plurality of segmented coplanar waveguides, according to the present teaching, that increases both the sensitivity and the flatness of the frequency response by distributing gain elements along a length of the modulation electrodes.

FIG. 5 illustrates a schematic view of an optical link 500 with an X-cut lithium niobate Mach-Zehnder interferometric type electro-optic modulator 502 with a plurality of single-ended amplifiers 504, 504', 504", 504''', and 504,'''' that drive a plurality of segmented coplanar waveguides 506, 506', 506", 506''', and 506,'''' according to the present teaching. Like the other embodiments, this modulator configuration increases both the sensitivity and the flatness of the frequency response by distributing gain elements along a length of the modulation electrodes. The electrode configuration shown in FIG. 5 is useful for electro-optic materials that respond to the horizontal component of the modulating electric field, such as X-cut lithium niobate. In those materials, the coplanar waveguide structure shown in FIG. 5 is a good choice.

In the particular embodiment shown in FIG. 5, the electrode configuration of the Mach-Zehnder interferometric type electro-optic modulator includes coplanar waveguides 506, 506', 506", 506''', and 506'''' having different lengths. In addition, in the particular embodiment shown in FIG. 5, each of the plurality of single-ended amplifiers 504, 504', 504", 504''', and 504'''' has a different gain. In various embodiments according to the present teaching, the lengths of the coplanar waveguides 506, 506', 506", 506''', and 506" can be the same or different lengths. Also, in various embodiments according to the present teaching, the gain of each of the plurality of single-ended amplifiers 504, 504', 504", 504''', and 504'''' can be the same or different. Varying the electrode length and/or the gain of each of the single-ended amplifiers 504, 504', 504", 504''', and 504'''' provides additional design parameters to achieve a desired combination of noise figure and spur-free dynamic range.

The modulator 502 includes an optical input that is coupled to an output of an optical source, such as a laser 508. The modulator 502 also includes a bias port 510 that receives a DC bias signal. This particular optical link 500 also uses an optical fiber 512 to convey the optically modulated signal from the modulator 502 to the photodetector 514, which can be, for example, a photodiode. The photodetector 514 generates an electrical modulation signal that is demodulated by a receiver.

One skilled in the art will appreciate that there are numerous variations in the modulator configuration of the electro-optic modulator according to the present teaching. In particular, one skilled in the art will appreciate that the present teachings are not limited to any particular type of modulator design or electro-optic material.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. An electro-optic modulator comprising:
    a) an optical waveguide;
    b) a plurality of electrode segments distributed proximate to a length of the optical waveguide;
    c) a plurality of amplifiers, at least one of the plurality of amplifiers having an RF input that receives an electrical modulation signal and at least one of the plurality of amplifiers having an input electrically connected to at least one of the plurality of electrode segments, each of the plurality of amplifiers being electrically connected between respective electrode segments so as to provide distributed gain,
        wherein a number of the plurality of amplifiers is chosen to achieve a desired spur-free dynamic range of the electro-optic modulator.

2. The electro-optic modulator of claim 1 wherein a performance of the plurality of amplifiers is chosen to achieve at least one of a desired gain, noise figure, frequency response, and spur-free dynamic range.

3. The electro-optic modulator of claim 1 wherein a length of at least one of the plurality of electrode segments is chosen achieve at least one of a desired gain, noise figure, frequency response, and spur-free dynamic range.

4. The electro-optic modulator of claim 1 wherein the optical waveguide is formed in an electro-optic semiconductor material.

5. The electro-optic modulator of claim 1 wherein the optical waveguide is formed in an electro-optic polymer.

6. The electro-optic modulator of claim 1 wherein the optical waveguide is formed in lithium niobate.

7. An electro-optic modulator comprising:
    a) a Mach-Zehnder interferometer having an optical input, a first arm comprising an optical waveguide, a second arm comprising an optical waveguide, a plurality of electrode segments distributed proximate to a length of the optical waveguides of the first and second arms, and an optical output; and
    b) a plurality of amplifiers, at least one of the plurality of amplifiers having an RF input that receives an electrical modulation signal and at least one of the plurality of amplifiers having an input electrically connected to at least one of the plurality of electrode segments, each of the plurality of amplifiers being electrically connected between respective electrode segments so as to provide distributed gain,
        wherein a number of the plurality of amplifiers is chosen to achieve a desired spur-free dynamic range of the electro-optic modulator.

8. The electro-optic modulator of claim 7 wherein a performance of the plurality of amplifiers is chosen to achieve at least one of a desired gain, noise figure, frequency response, and spur-free dynamic range.

9. The electro-optic modulator of claim 7 wherein the plurality of electrode segments distributed proximate to a length of the optical waveguides of the first and second arms is distributed uniformly.

10. The electro-optic modulator of claim 7 wherein the plurality of electrode segments distributed proximate to a length of the optical waveguides of the first and second arms is distributed non-uniformly.

11. The electro-optic modulator of claim 7 wherein a length of the at least one of the plurality of electrode segments distributed proximate to the length of the optical waveguide of the first and second arms is selected to achieve a desired gain, noise figure, frequency response, and spur-free dynamic range.

12. The electro-optic modulator of claim 7 wherein a gain of each of the plurality of amplifiers is the same.

13. The electro-optic modulator of claim 7 wherein a gain of at least one of the plurality of amplifiers is different from a gain of at least one other of the plurality of amplifiers.

14. The electro-optic modulator of claim 7 wherein a gain of at least one of the plurality of amplifiers is selected to achieve at least one of a desired gain, noise figure, frequency response, and spur-free dynamic range.

15. The electro-optic modulator of claim 7 wherein a gain of at least one of the plurality of amplifiers is selected to achieve a combination of a desired gain, noise figure, frequency response, and spur-free dynamic range.

16. The electro-optic modulator of claim 7 wherein the Mach-Zehnder interferometer is formed on X-cut lithium niobate material.

17. The electro-optic modulator of claim 7 wherein the Mach-Zehnder interferometer is formed on Z-cut lithium niobate material.

18. The electro-optic modulator of claim 7 wherein the Mach-Zehnder interferometer is formed on an electro-optic semiconductor material.

19. The electro-optic modulator of claim 7 wherein the Mach-Zehnder interferometer is formed on an electro-optic polymer.

20. A method of designing an electro-optic modulator to achieve a combination of a desired noise figure and spur-free dynamic range, the method comprising:
    a) providing a Mach-Zehnder interferometer having a first arm comprising an optical waveguide, a second arm comprising an optical waveguide, and a plurality of electrode segments distributed along or proximate to a length of the optical waveguides of the first and second arms;
    b) providing a plurality of amplifiers with at least one of the plurality of amplifiers having an input electrically connected to at least one of the plurality of electrode segments, each of the plurality of amplifiers being electrically connected between respective electrode segments in both of the first and second arms so as to provide distributed gain; and
    c) selecting at least one of a number of the plurality of amplifiers, a gain of at least one of the plurality of amplifiers, and a length of at least one of the electrode segment in one or both of the first and second arms to achieve a desired combination of noise figure and spur-free dynamic range of the electro-optic modulator.

21. The method of claim 20 further comprising selecting a geometry of at least one of the plurality of electrode segments in one or both of the first and second arms to achieve at least one of a desired gain, noise figure, frequency response, and spur-free dynamic range.

22. The method of claim 20 further comprising selecting a total gain of all of the plurality of amplifiers to achieve at least one of a desired gain, noise figure, frequency response, and spur-free dynamic range.

23. The method of claim 20 further comprising selecting an individual noise figure of at least one of the plurality of amplifiers to achieve at least one of a desired gain, noise figure, frequency response, and spur-free dynamic range.

24. The method of claim 20 further comprising selecting an individual spur-free dynamic range of at least one of the plurality of amplifiers to achieve at least one of a desired gain, noise figure, frequency response, and spur-free dynamic range.

25. The electro-optic modulator of claim 7 wherein the Mach-Zehnder interferometer is formed in silicon.

26. An electro-optic modulator comprising:
    a) an optical waveguide;
    b) a plurality of electrode segments distributed proximate to a length of the optical waveguide;
    c) a plurality of amplifiers, at least one of the plurality of amplifiers having an RF input that receives an electrical modulation signal and at least one of the plurality of amplifiers having an input electrically connected to at least one of the plurality of electrode segments, each of the plurality of amplifiers being electrically connected between respective electrode segments so as to provide distributed gain,
        wherein a number of the plurality of amplifiers is chosen to achieve a desired spur-free dynamic range and a desired noise figure of the electro-optic modulator.

27. The electro-optic modulator of claim 26 wherein a performance of the plurality of amplifiers is chosen to achieve at least one of a desired gain, frequency response, and spur-free dynamic range.

28. The electro-optic modulator of claim 26 wherein a length of at least one of the plurality of electrode segments is chosen achieve at least one of a desired gain, frequency response, and spur-free dynamic range.

29. The electro-optic modulator of claim 26 wherein the optical waveguide is formed in an electro-optic semiconductor material.

30. The electro-optic modulator of claim 26 wherein the optical waveguide is formed in an electro-optic polymer.

31. The electro-optic modulator of claim 26 wherein the optical waveguide is formed in lithium niobate.

32. The electro-optic modulator of claim 26 wherein the optical waveguide is formed in silicon.

33. The electro-optic modulator of claim 1 wherein a spur-free dynamic range of one of the plurality of amplifiers is chosen to achieve the desired spur-free dynamic range of the electro-optic modulator.

34. The electro-optic modulator of claim 1 where a noise figure of one of the plurality of amplifiers is chosen to achieve a noise figure of the electro-optic modulator.

35. The electro-optic modulator of claim 7 wherein a spur-free dynamic range of one of the plurality of amplifiers is chosen to achieve the desired spur-free dynamic range of the electro-optic modulator.

36. The electro-optic modulator of claim 7 wherein a noise figure of one of the plurality of amplifiers is chosen to achieve a noise figure of the electro-optic modulator.

37. The method of claim 20 further comprising selecting a spur-free dynamic range of at least one of the plurality of amplifiers to achieve the desired combination of noise figure and spur-free dynamic range of the electro-optic modulator.

38. The method of claim 20 further comprising selecting a noise figure of at least one of the plurality of amplifiers to achieve the desired combination of noise figure and spur-free dynamic range of the electro-optic modulator.

39. The electro-optic modulator of claim 26 wherein a spur-free dynamic range of one of the plurality of amplifiers is chosen to achieve the desired spur-free dynamic range and the desired noise figure of the electro-optic modulator.

40. The electro-optic modulator of claim 26 wherein a noise figure of one of the plurality of amplifiers is chosen to achieve the spur-free dynamic range and the desired noise figure of the electro-optic modulator.

* * * * *